(12) United States Patent
Okada

(10) Patent No.: US 8,079,090 B2
(45) Date of Patent: Dec. 13, 2011

(54) LICENSE MANAGEMENT SYSTEM, CONTROL METHOD THEREOF, IMAGE PROCESSING APPARATUS, AND CONTROL METHOD THEREOF

(75) Inventor: Hideyuki Okada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 871 days.

(21) Appl. No.: 11/781,037

(22) Filed: Jul. 20, 2007

(65) Prior Publication Data

US 2008/0148412 A1 Jun. 19, 2008

(30) Foreign Application Priority Data

Dec. 14, 2006 (JP) ................................ 2006-337587

(51) Int. Cl.
G06F 7/04 (2006.01)
G06F 17/30 (2006.01)
H04N 7/16 (2006.01)
(52) U.S. Cl. ....................................................... 726/27
(58) Field of Classification Search ...................... 726/27
See application file for complete search history.

(56) References Cited

U.S. PATENT DOCUMENTS

| | | | |
|---|---|---|---|
| 6,990,434 B2 | 1/2006 | Minogue | |
| 7,228,567 B2 | 6/2007 | Serkowski | |
| 7,530,117 B2 | 5/2009 | Tanaka | |
| 2003/0110213 A1 | 6/2003 | Munetsugu | |
| 2004/0044901 A1 | 3/2004 | Serekowski | |
| 2004/0254888 A1 | 12/2004 | Tanaka | |
| 2005/0108566 A1 | 5/2005 | Minogue | |
| 2006/0021012 A1 | 1/2006 | Ito | |
| 2007/0179899 A1* | 8/2007 | Hase et al. ..................... 705/59 | |

FOREIGN PATENT DOCUMENTS

| | | |
|---|---|---|
| CN | 1591268 | 3/2005 |
| EP | 1 486 854 | 12/2004 |
| JP | 2003-233597 | 8/2003 |
| JP | 2004-13662 | 1/2004 |
| JP | 2004-21400 | 1/2004 |
| JP | 2005-004448 | 1/2005 |
| JP | 2005-212218 | 8/2005 |
| JP | 2006-244079 | 9/2006 |
| JP | 2006-277087 | 10/2006 |
| JP | 2006-285774 | 10/2006 |

OTHER PUBLICATIONS

Chinese Office Action dated May 8, 2009 issued during prosecution of related Chinese application No. 2007-10140062.2 and whole English-language translation. European Search Report dated May 9, 2008 issued during prosecution of related European Application No. 07113704.6.
Japanese Office Action dated Sep. 30, 2011 issued during prosecution of related Japanese application No. 2006-337587.

* cited by examiner

Primary Examiner — Kambiz Zand
Assistant Examiner — Stephen Sanders
(74) Attorney, Agent, or Firm — Fitzpatrick, Cella, Harper & Scinto

(57) ABSTRACT

A license management system includes a license management server, an information processing apparatus, and an image forming apparatus. To simplify application activation on the image forming apparatus, the device comprises a first input unit that inputs first license information, a first transmission unit that transmits the first license information to the license management server, a second input unit that inputs information from the license management server regarding the possibility of issuing second license information, a second transmission unit that transmits unique information that is preset on the apparatus to the license management server when information that it is possible to issue the second license information is inputted, a third input unit adapted to inputting the second license information that is issued from the license management server, and a unit that activates the application program in accordance with the second license information.

9 Claims, 19 Drawing Sheets

FIG. 2

| LA# | DS# | LF |
|---|---|---|
| LA#1 | DS#1-1 | LF#1-1 |
| LA#2 | DS#1-2 | LF#1-2 |
| | | |

| LA# | DS# | LF |
|---|---|---|
| #1 | | |
| | | |
| | | |

| LA# | DS# | LF |
|---|---|---|
| #1 | DS#1-1 | LF#1-1 |
|  |  |  |
|  |  |  |

| LA# | DS# | LF |
|---|---|---|
| #1 | DS#2-1 | LF#2-1 |
|  | DS#2-2 | LF#2-2 |
|  | DS#2-3 | LF#2-3 |

1601

LICENSE MANAGEMENT SYSTEM, CONTROL METHOD THEREOF, IMAGE PROCESSING APPARATUS, AND CONTROL METHOD THEREOF

BACKGROUND OF THE INVENTION

1. Field of the Invention

The present invention relates to license management system, which performs license authentication over a network, a control method thereof, an image processing apparatus and a control method thereof.

2. Description of the Related Art

In recent times a license management system has been developed that manages information of an application and of a device that executes the application. Use of the license management system allows, for example, execution of the application, also referred to as "activation," on only a specified device. A license management system of such a type associates a device-specific ID with an application specific ID and a license, and manages the information in such a linked manner. Installing the application and a license file associated therewith on the device allows the application to be executed on the device.

It would be permissible to perform the license management over a network. For example, a content distribution system recited in Japanese Patent Laid-Open No. 2003-233597 discloses a technology that distributes three types of data over a network from a server: content, an executable program that processes the content, and conditions of usage for the content and the executable program. Japanese Patent Laid-Open No. 2005-4448 discloses a technology that batch inputs, into a user system, a license access number and a number of a device wherein the application is installed, and the user system receives a batch license issuance from a license management server.

Such a license management system as the preceding, however, has problems such as the following: the user must prepare by collecting the device ID, and must register both the device ID thus collected and the application ID with the license management system. Such user involvement with the registration work raises the possibility of an error occurring, as well as of registration of a false device ID. It is also necessary for the user to perform the work of installing the license information, upon issue, on the device, and activate the application, consequently breaking synchronization in the timing between the issuance of the license and the activation of the application, and thus precluding obtaining corroboration that the license was installed for certain on the device. Additionally, the volume of work and the load increases linearly with an increase in the number or type of devices.

SUMMARY OF THE INVENTION

The present invention was made with the preceding problems in mind, and has as an object the simplification of the work of installing the application.

According to one aspect of the present invention, a license management system, including a license management server, an information processing apparatus, and an image forming apparatus, which are bidirectionally connected over a network, adapted to performing an activate process of an application program that runs on the image forming apparatus in accordance with an operation by a user on the information processing apparatus; wherein: the license management server comprises: a storage unit adapted to storing a first license information that is associated with the application program; an issue unit adapted to issuing a second license information in accordance with the first license information and a unique information that is preset on the image forming apparatus; and a determination unit adapted to determining whether or not it is possible to issue a new second license information, in accordance with the first license information and a number of already issued second license information that is issued in accordance with the first license information; wherein: the information processing apparatus comprises: an operation input unit adapted to receiving an operation input from the user; and a designation unit adapted to performing a designation of one or more of the image forming apparatus whereupon the activate process of the application program is to be performed, in accordance with the input from the operation input unit; and wherein: the image forming apparatus comprises: a first input unit adapted to inputting the first license information from the information processing apparatus; a first transmission unit adapted to transmitting the first license information to the license management server when the first license information is inputted; a second input unit adapted to inputting an information from the license management server as to whether or not it is possible to issue the second license information; a second transmission unit adapted to transmitting the unique information that is preset on the apparatus to the license management server when the information that it is possible to issue the second license information is inputted; a third input unit adapted to inputting the second license information that is issued from the license management server; and an activation unit adapted to executing the activation of the application program in accordance with the second license information.

According to another aspect of the present invention, a license management system, including a license management server and an image forming apparatus adapted to performing an activate process of an application program that runs on one or more of the image forming apparatus in accordance with an operation by a user, which are bidirectionally connected over a network; wherein: the license management server comprises: a storage unit adapted to storing a first license information that is associated with the application program; an issue unit adapted to issuing a second license information in accordance with the first license information and a unique information that is preset on the image forming apparatus; and a determination unit adapted to determining whether or not it is possible to issue a new second license information, in accordance with the first license information and a number of already issued second license information that is issued in accordance with the first license information; and wherein: the image forming apparatus comprises: an operation input unit adapted to receiving an operation input from the user; a designation unit adapted to performing a designation of one or more of the image forming apparatus whereupon the activate process of the application program is to be performed, in accordance with the input from the operation input unit; a first input unit adapted to inputting the first license information via the operation input unit; a first transmission unit adapted to transmitting the first license information to the license management server when the first license information is inputted; a second input unit adapted to inputting an information from the license management server as to whether or not it is possible to issue the second license information; a second transmission unit adapted to transmitting the unique information that is preset on the apparatus to the license management server when the information that it is possible to issue the second license information is inputted; a third input unit adapted to inputting the second license information that is issued from the license management server; and an activation unit adapted to executing the activation of the application program in accordance with the second license information.

According to still another aspect of the present invention, a method of controlling a license management system, including a license management server, an information processing apparatus, and an image forming apparatus, which are bidirectionally connected over a network, adapted to performing an activate process of an application program that runs on the image forming apparatus in accordance with an operation by a user on the information processing apparatus; wherein: the license management server comprises the steps of: storing a first license information that is associated with the application program; issuing a second license information in accordance with the first license information and a unique information that is preset on the image forming apparatus; and determining whether or not it is possible to issue a new second license information, in accordance with the first license information and a number of already issued second license information that is issued in accordance with the first license information; wherein: the information processing apparatus comprises the steps of: receiving an operation input from the user; and performing a designation of one or more of the image forming apparatus whereupon the activate process of the application program is to be performed, in accordance with the input from the operation input step; and wherein: the image forming apparatus comprises the steps of: inputting the first license information from the information processing apparatus; transmitting the first license information to the license management server when the first license information is inputted; inputting an information from the license management server as to whether or not it is possible to issue the second license information; transmitting the unique information that is preset on the apparatus to the license management server when the information that it is possible to issue the second license information is inputted; inputting the second license information that is issued from the license management server; and executing the activation of the application program in accordance with the second license information.

According to yet another aspect of the present invention, a method of controlling a license management system, including a license management server and an image forming apparatus adapted to performing an activate process of an application program that runs on one or more of the image forming apparatus in accordance with an operation by a user, which are bidirectionally connected over a network; wherein: the license management server comprises the steps of: storing a first license information that is associated with the application program; issuing a second license information in accordance with the first license information and a unique information that is preset on the image forming apparatus; and determining whether or not it is possible to issue a new second license information, in accordance with the first license information and a number of already issued second license information that is issued in accordance with the first license information; and wherein: the image forming apparatus comprises the steps of: receiving an operation input from the user; performing a designation of one or more of the image forming apparatus whereupon the activate process of the application program is to be performed, in accordance with the input from the operation input step; inputting the first license information via the operation input step; transmitting the first license information to the license management server when the first license information is inputted; inputting an information from the license management server as to whether or not it is possible to issue the second license information; transmitting the unique information that is preset on the apparatus to the license management server when the information that it is possible to issue the second license information is inputted; inputting the second license information that is issued from the license management server; and executing the activation of the application program in accordance with the second license information.

According to still yet another aspect of the present invention, an image processing apparatus adapted to performing an activate process of an application program that runs thereupon, by communicating with a license management server over a network, the image processing apparatus comprising: a first input unit adapted to inputting a first license information that is associated with the application program; a first transmission unit adapted to transmitting the first license information to the license management server when the first license information is inputted; a second input unit adapted to inputting an information from the license management server as to whether or not it is possible to issue a license; a second transmission unit adapted to transmitting a unique information that is preset on the apparatus to the license management server when an information that it is possible to issue the license is inputted; a third input unit adapted to inputting a second license information that is issued from the license management server in response to the unique information; and an activation unit adapted to executing the activation of the application program in accordance with the second license information.

According to yet still another aspect of the present invention, an image processing apparatus adapted to performing an activate process of an application program that runs on one or more of the image processing apparatus, in accordance with an operation by a user, by communicating with a license management server over a network, the image processing apparatus comprising: an operation input unit adapted to receiving an operation input from the user; a designation unit adapted to performing a designation of one or more of the image forming apparatus whereupon the activate process of the application program is to be performed, in accordance with the input from the operation input unit; a first input unit adapted to inputting the first license information that is associated with the application program; a first transmission unit adapted to transmitting the first license information to the license management server when the first license information is inputted; a second input unit adapted to inputting an information from the license management server as to whether or not it is possible to issue a license; a second transmission unit adapted to transmitting a unique information that is preset on the apparatus to the license management server when an information that it is possible to issue the license is inputted; a third input unit adapted to inputting a second license information that is issued from the license management server in response to the unique information; and an activation unit adapted to executing the activation of the application program in accordance with the second license information.

According to still yet another aspect of the present invention, a method of controlling an image processing apparatus adapted to performing an activate process of an application program that runs thereupon, by communicating with a license management server over a network, the control method comprising the steps of: inputting a first license information that is associated with the application program; transmitting the first license information to the license management server when the first license information is inputted; inputting an information from the license management server as to whether or not it is possible to issue a license; transmitting a unique information that is preset on the apparatus to the license management server when an information that it is possible to issue the license is inputted; inputting a second license information that is issued from the license management server in response to the unique information; and executing the activation of the application program in accordance with the second license information.

According to yet still another aspect of the present invention, a method of controlling an image processing apparatus adapted to performing an activate process of an application program that runs on one or more of the image processing apparatus, in accordance with an operation by a user, by communicating with a license management server over a network, the control method comprising the steps of: receiving an operation input from the user; performing a designation of one or more of the image forming apparatus whereupon the activate process of the application program is to be performed, in accordance with the input from the operation input unit; inputting the first license information that is associated with the application program; transmitting the first license information to the license management server when the first license information is inputted; inputting an information from the license management server as to whether or not it is possible to issue a license; transmitting a unique information that is preset on the apparatus to the license management server when an information that it is possible to issue the license is inputted; inputting a second license information that is issued from the license management server in response to the unique information; and executing the activation of the application program in accordance with the second license information.

According to the present invention, it would be possible to offer a technology that allows the user to perform the work of installing the application more easily than is currently possible.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 conceptually depicts a license management table that is maintained by an LMS server.

FIG. 5 depicts the license management table immediately after a license access number is issued.

FIG. 7 depicts the license management table immediately after a license file is issued.

FIG. 16 depicts the license management table immediately after a license file is issued.

DESCRIPTION OF THE EMBODIMENTS

The following is a detailed description of preferred embodiments of the invention, with reference to the attached drawings. It is to be understood that the embodiments are only examples of the invention, and are not intended to limit the scope thereof.

First Embodiment

The following is a description of an apparatus that performs an application install process as a first embodiment of an image processing apparatus, according to the present invention.

System Configuration

Figure 1:
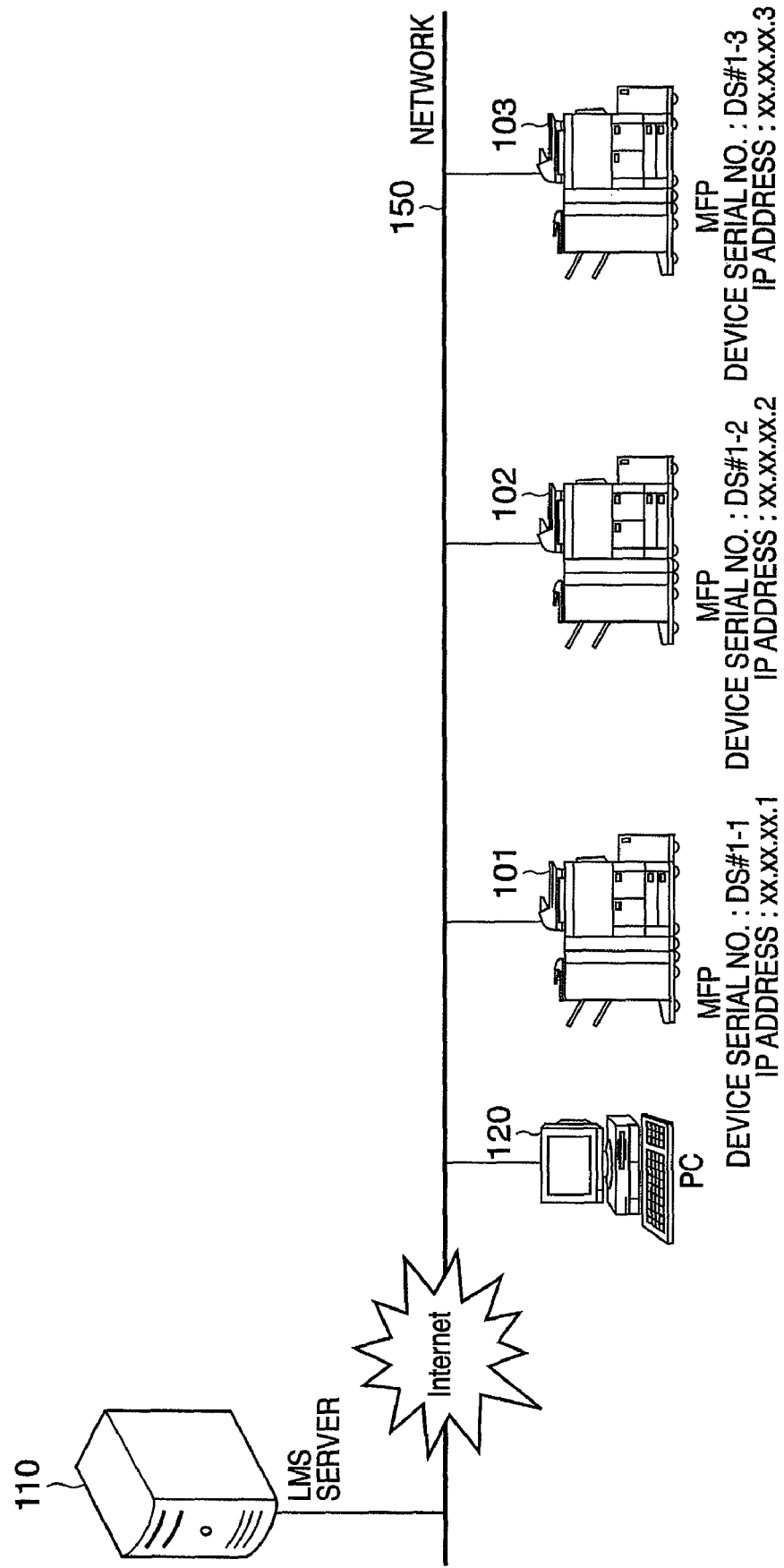
FIG. 1 is a configuration of a network system that includes an MFP, which is an image processing apparatus, according to a first embodiment.

FIG. 1 is a configuration of a network system that includes an MFP, which is the image processing apparatus, according to the first embodiment.

The system is configured of a license management system (LMS) server 110, a PC 120 that serves as a client terminal that a user operates, and digital multifunction peripherals (MFP) 101 through 103. The LMS server 110, the PC 120, and the MFPs 101 through 103 are each bidirectionally connected via a network 150. The following is a description of a condition wherein an application program is installed on the MFP as a consequence of the user operating the PC 120. It is presumed that each respective MFP has a device serial number, which is set thereto and that is unique to the MFP, that is, DS #1-1, DS #1-2, DS #1-3, as well as a unique IP address, that is, xx.xx.xx.1, xx.xx.xx.2, xx.xx.xx.3.

Figure 2:
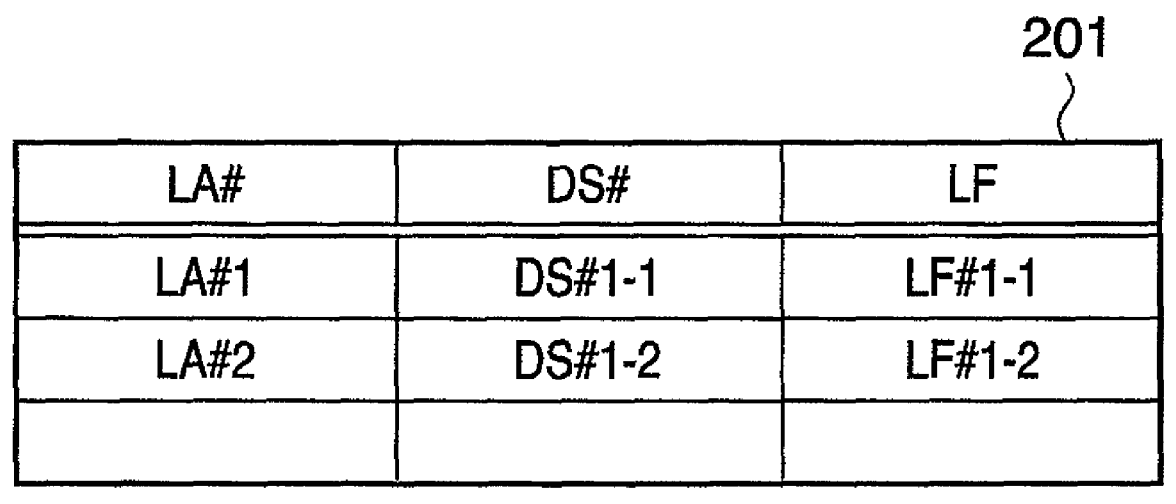

FIG. 2 conceptually depicts a license management table 201 that is maintained by the LMS server 110. In the present circumstance, the license management table 201 contains a license access number (LA#), a device serial number (DS#), and a license file (LF). The license access number (LA#) is issued and maintained by the LMS server 110 when an application license is purchased. The device serial number (DS#) is registered with the LMS server 110 when the application is installed on the MFP, and the license file (LF) is issued by the LMS server 110 upon installation. FIG. 2 thus depicts a status of relating, storing, and managing a status wherein one license is issued when the application is purchased, and the license file (LF) is issued to the MFP that possesses the device serial number (DS#).

Figure 3:
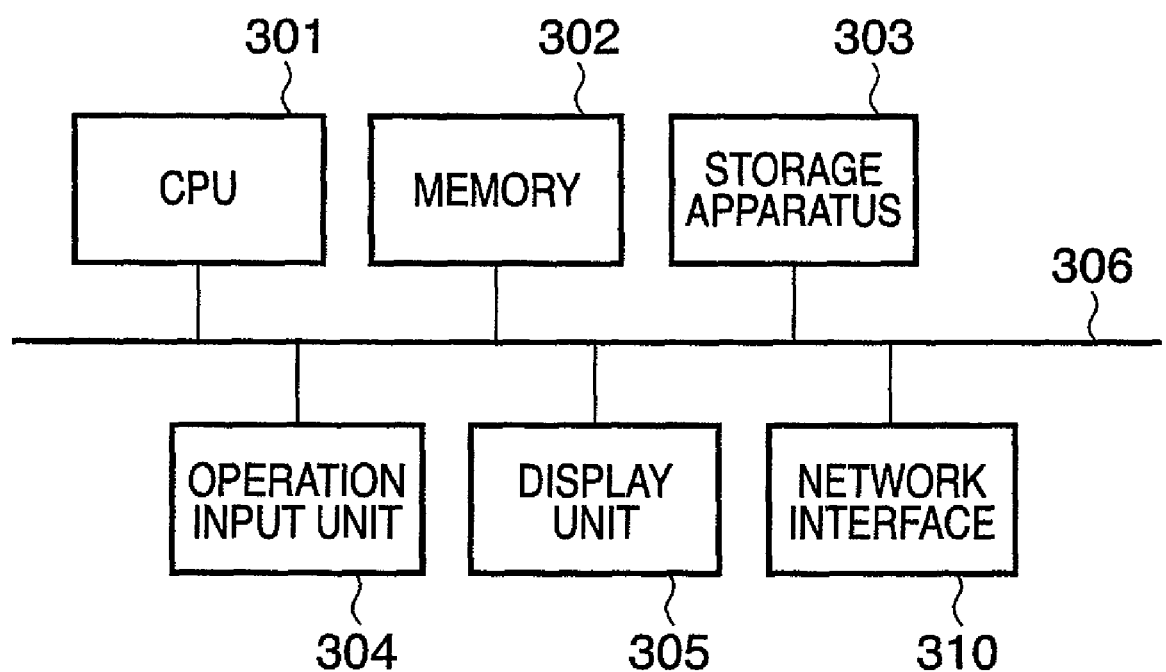
FIG. 3 is an internal configuration of the MFP.

FIG. 3 is an internal configuration of the MFP. The drawing depicts components that are involved with the application install process.

The MFP 101 comprises a CPU 301, a memory 302, a storage apparatus 303, an operation input unit 304, a display unit 305, and a network interface 310, each of which is bidirectionally connected via a bus 306.

The CPU 301 executes various programs that are stored in the storage apparatus 303, which stores an application install process program and an installed application program 307, to be described hereinafter. The storage apparatus 303 is composed of a large volume storage apparatus, for example, a hard drive. The CPU 301 temporarily stores the programs or data that it loads from the storage apparatus 303 in the memory 302, which is also used as a space for the CPU 301 to execute the various programs. The operation input unit 304 and the display unit 305 are composed of, for example, a touchscreen display, and have a function to receive various MFP setting operations from the user, and display the results thereof. The network interface 310 is for connecting to the network 150, and communicating with the LMS server 110, the PC 120, or another MFP.

Detailed Operation of the Application Install Process

Figure 4:
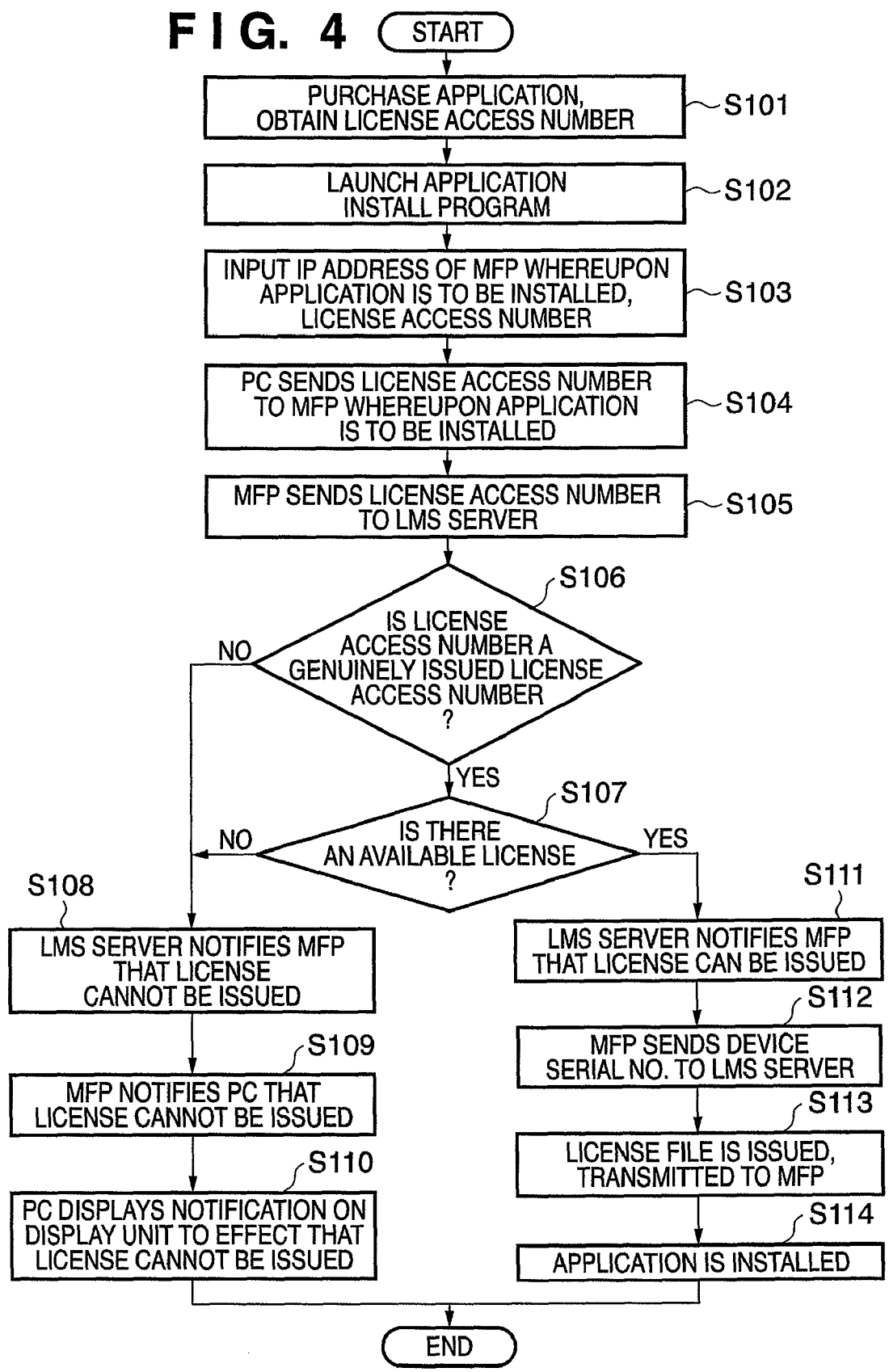
FIG. 4 is a flowchart of an installation of an application on the MFP, according to the first embodiment.

FIG. 4 is a flowchart of an installation of an application on the MFP, according to the first embodiment. The following operation of the MFPs 101 through 103 is implemented by the CPU 301 in each MFP executing the application install process program that is stored on the storage apparatus 303 thereof. The following operation of the LMS server 110 is implemented by a license management program that is executed on the LMS server 110. The following operation of the PC 120 is implemented by an application install program, to be described hereinafter, that the PC 120 executes.

In step S101, the user makes an offline purchase, for example, at a store, of an application and a license for the application. It is presumed in the present circumstance that a license for three MFPs is purchased. It would be permissible to configure the present step so as to employ the PC 120 to make the purchase over the Internet. Consequently, the PC 120 would obtain both the application software and the license access number LA#1.

Figure 5:
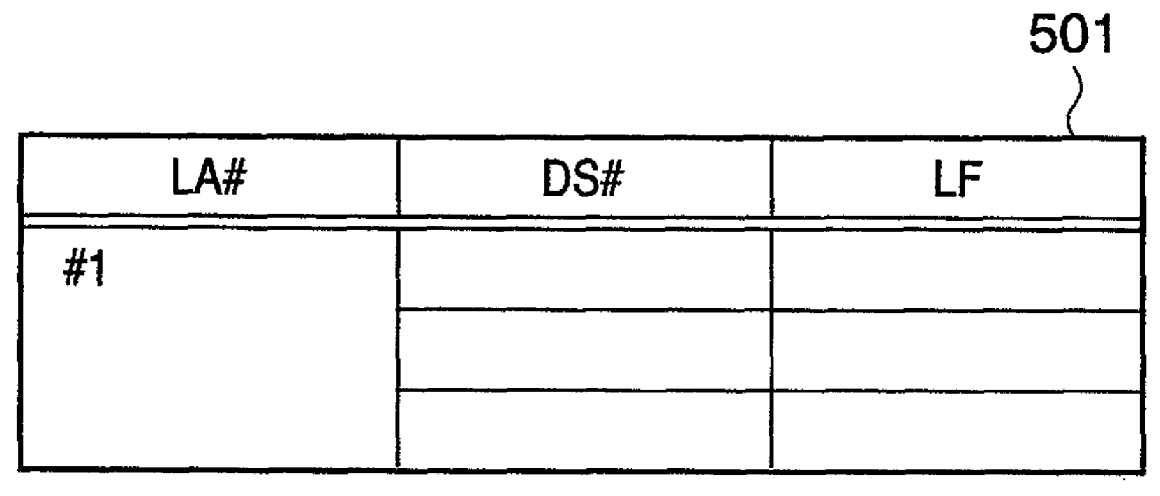

FIG. 5 depicts the license management table immediately after the license access number is issued. At the point in time in question, the license access number LA#1, that is, a first license information, that is issued in step S101, is registered. The three respective fields of the device serial number (DS#), that is, a unique identifier information, and the license file, that is, a second license information, that correspond to the license access number LA#1 are all empty, however, signifying readiness to accept registration.

In step S102, the PC 120 launches the application install program.

Figure 6:
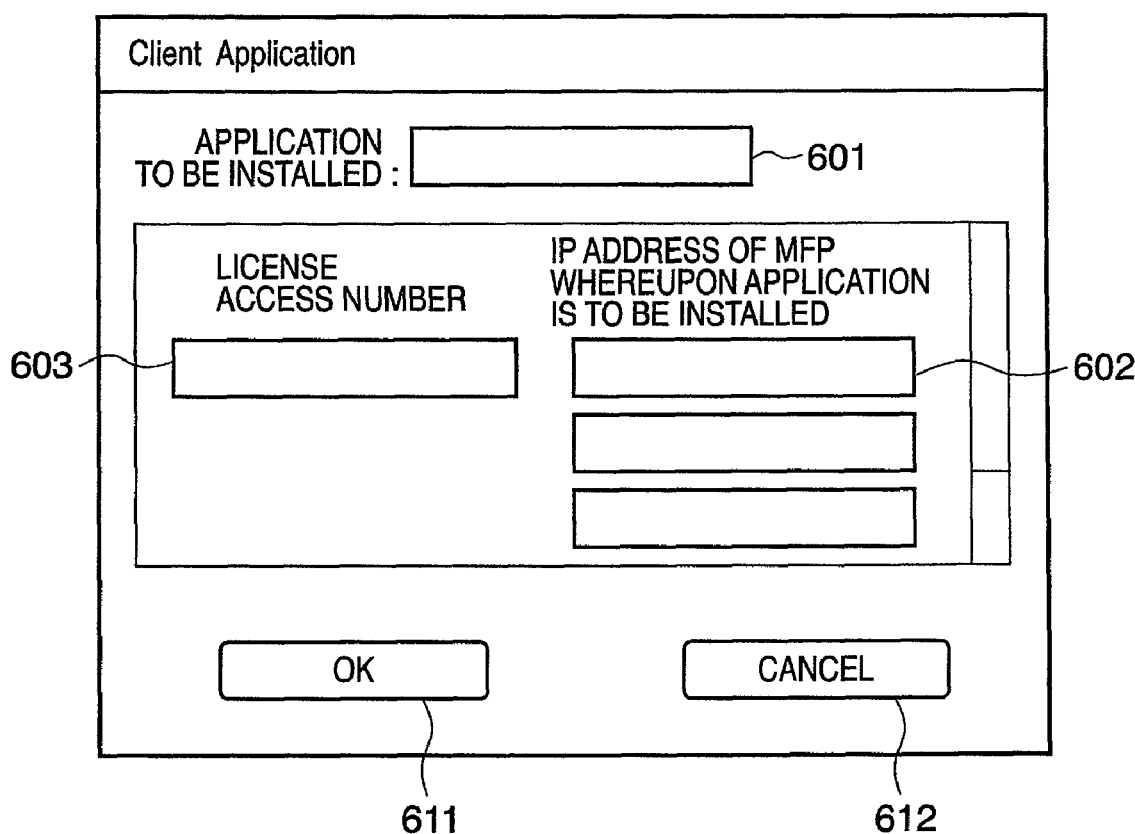
FIG. 6 depicts a dialogue window of an application install program.

FIG. 6 depicts a dialogue window of the application install program. The dialogue window is displayed on a display unit (not shown) of the PC 120. A field 601 that selects the application to be installed is positioned in the dialogue window, and the dialogue window receives a selection from the user via such as a pull-down menu. A field 602 is positioned that inputs the IP address of the MFP whereupon the application that is set in the field 601 is to be installed. Also positioned in the dialogue window are such elements as a field 603 that inputs the license access number that is obtained in step S101, an OK button 611, and a cancel button 612.

In step S103, the PC 120 receives an input from the user of the application, the IP address of the MFP whereupon the application is to be installed, and the license access number LA#1. The PC 120 receives input from step S102 into each respective field of the dialogue window that is displayed therein. When the input is received and the OK button 611 is depressed, the process proceeds to step S104. It is presumed in the present circumstance that the application is being installed only on the MFP 101, and that the input IP address is "xx.xx.xx.1".

In step S104, the PC 120 sends the license access number LA#1 to the MFP whereupon the application is to be installed. In the present circumstance, the PC 120 sends the license access number LA#1 to the MFP 101 over the network 150.

In step S105, the MFP 101 receives the license access number LA#1 from the PC 120, and sends the license access number LA#1 thus received to the LMS server 110.

In step S106, upon receipt of the license access number LA#1, the LMS server 110 evaluates whether or not the license access number is a genuinely issued license access number. The LMS server 110 verifies whether or not the LA# is present in the license management table 201. If the license access number is genuine, the process proceeds to step S107; if not, the process proceeds to step S108.

In step S107, the LMS server 110 verifies whether or not the rest of the license pertaining to the license access number LA#1 is satisfied. Put another way, the LMS server 110 verifies whether the fields of the DS# or the LF corresponding to the LA# are empty or not. If the LMS server 110 determines that an empty field is present, the process proceeds to step S111; if not, the process proceeds to step S108.

In step S111, the LMS server 110 notifies the MFP, that is, the MFP 101 in the present circumstance, which sent the license access number LA#1 that the LMS server 110 received in step S106, that the MFP is eligible to have a license issued thereto.

In step S112, upon receipt of the notification of eligibility from the LMS server 110, the MFP 101 sends its device serial number DS#1-1 to the LMS server 110.

In step S113, the LMS server 110 receives the DS#1-1 and enters the serial number in the license management table 201. The LMS server 110 issues a license file LF#1-1, which it sends to the MFP 101.

Figure 7:
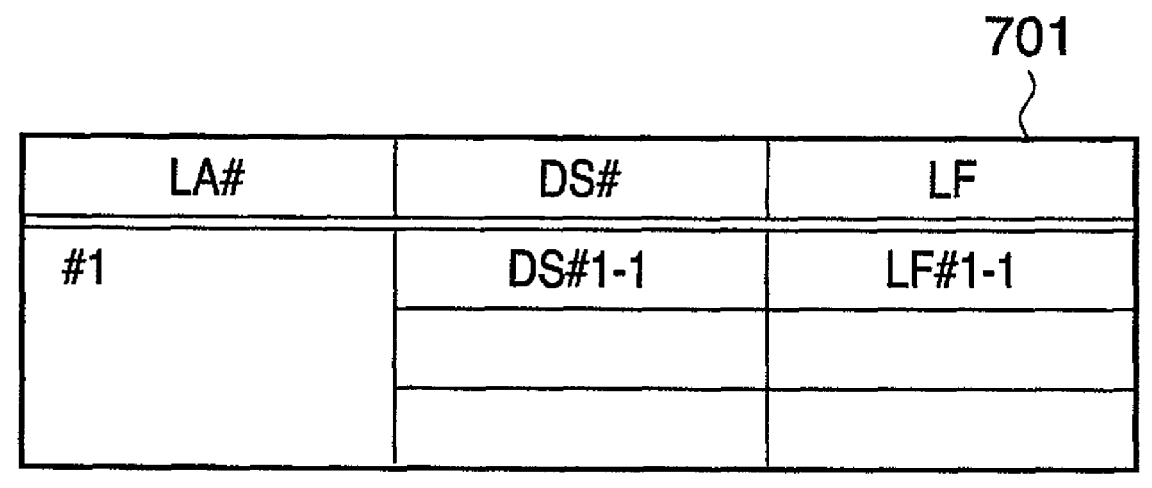

FIG. 7 depicts the license management table immediately after the license file is issued. DS#1-1 is registered in one of the three device serial number DS# fields corresponding to the license access number LA#1 that is issued in step S101, with the corresponding license file registered accordingly.

In step S114, the MFP 101 receives the license file LF#1-1, which it employs in installing the application. More specifically, the MFP 101 downloads an application program, that is, a file or a plurality of files, from the PC 120, and activates the application program. The process flow thereby terminates.

In step S108, the LMS server 110 notifies the MFP, that is, the MFP 101 in the present circumstance, which sent the license access number LA#1 that the LMS server 110 received in step S106 that the MFP is ineligible to have a license issued thereto.

In step S109, the MFP 101 notifies the PC 120 of its ineligibility for a license.

Figure 8:
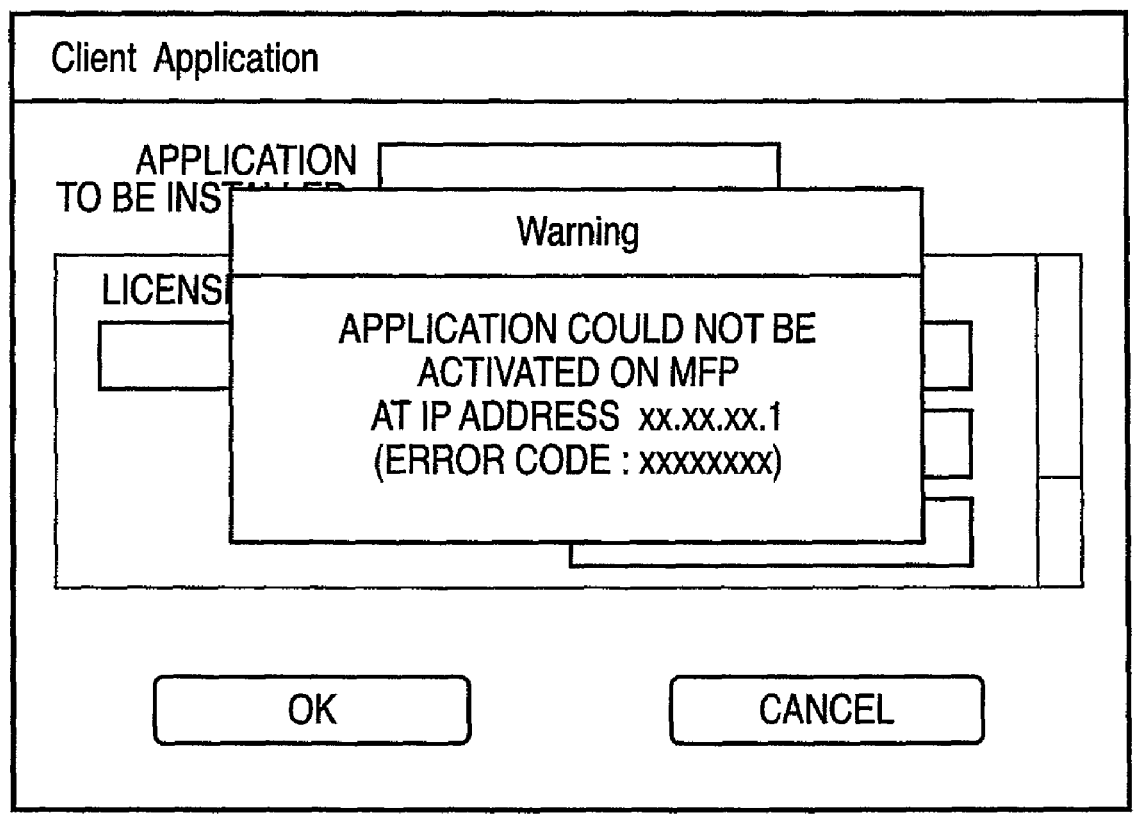
FIG. 8 depicts an example of a display window that issues a notification that an installation could not be carried out.

In step S110, the PC 120 displays on a display unit (not shown) that it has received the notice of ineligibility for a license from the MFP 101. Put another way, the PC 120 notifies the user that the application cannot be installed. The process flow terminates thereby. FIG. 8 depicts an example of a display window that issues a notification that an installation could not be carried out.

Per the foregoing, according to the first embodiment, the trigger for the MFP 101 to execute the application install process is the notification from the PC 120 of the license access number. Performing the install process according to the preceding operation allows obviating the complex work of searching out the device ID of the MFP on the part of the user, leading to a potential increase in usability, while simultaneously facilitating a reduction in such problems as input errors or entering of false information.

It would also be permissible, for example, to have a configuration with four separate freestanding units that comprise the image forming apparatus according to claim 2, that is, a first and a second transmission unit and a second and a third input unit, as a shared module. For example, in the MFP 101, the CPU 301 implements the four units executing a single application install process, using the network interface 310.

While the foregoing description cites the application program being installed by being sent from the PC 120, a configuration wherein the application program is sent from the LMS server 110 would be permissible as well. Another permissible configuration would be to preload the application program onto the storage apparatus 303 within the MFP 101, and perform only the activation of the application program in the registration flow process.

Implementation would also be possible by preregistering the IP address of the LMS server 110, which is necessary when the MFP 101 communicates with the PC 120, with such as the application install process program within the MFP 101. Another permissible configuration would be for the PC 120 to notify the MFP 101.

First Variant Example

While the description of step S104 involved direct reception of the IP address on the part of the MFP whereupon the application is to be installed, another permissible configuration would be for the PC 120 to search for MFPs that are connected to the network, for example, on a common subnet, and receive a selection of the MFP whereupon the application is to be installed from a list of MFPs thus detected.

Figure 9:
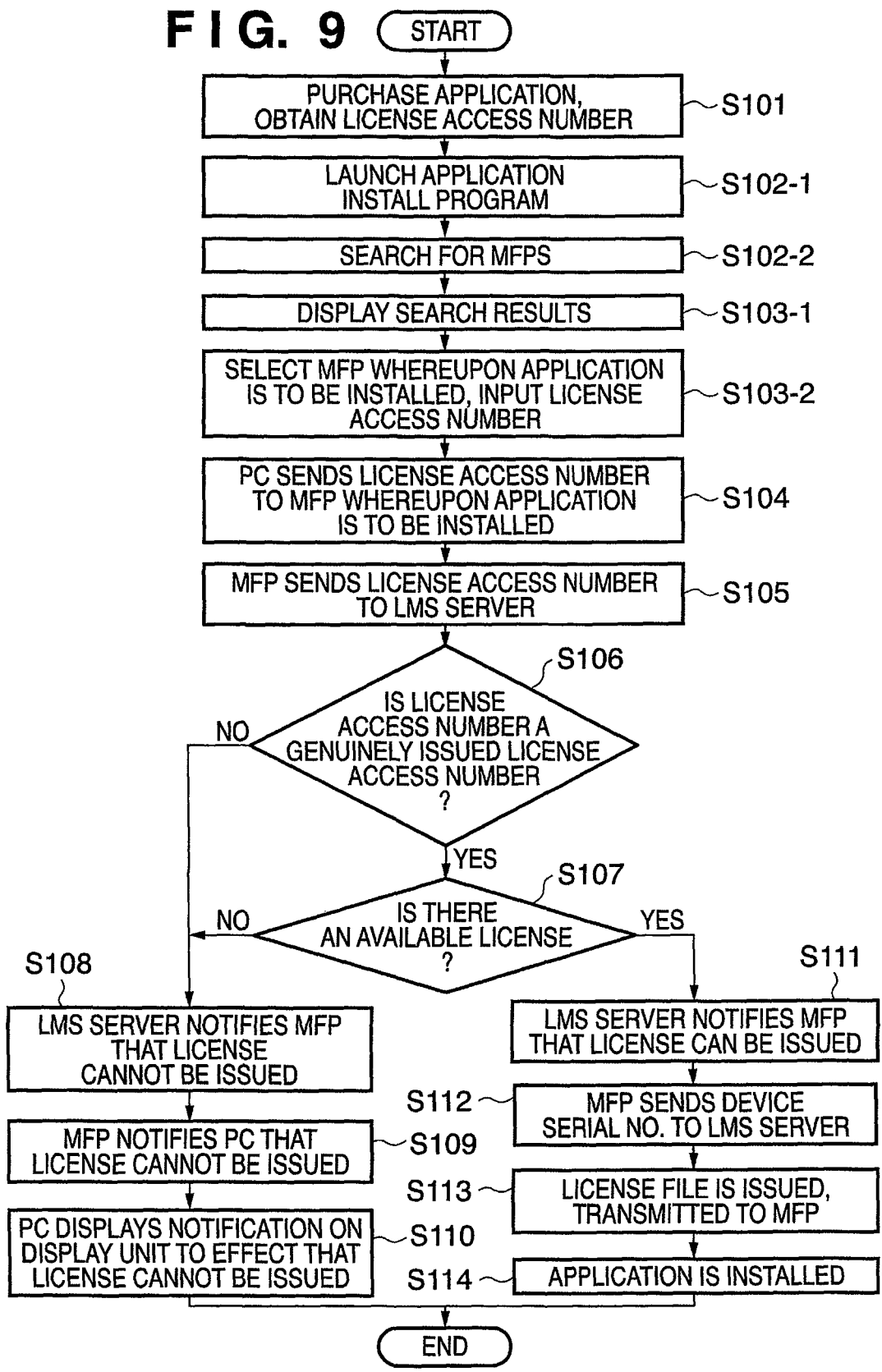
FIG. 9 is a flowchart of an installation of an application on the MFP, according to a first variant example.
Figure 10:
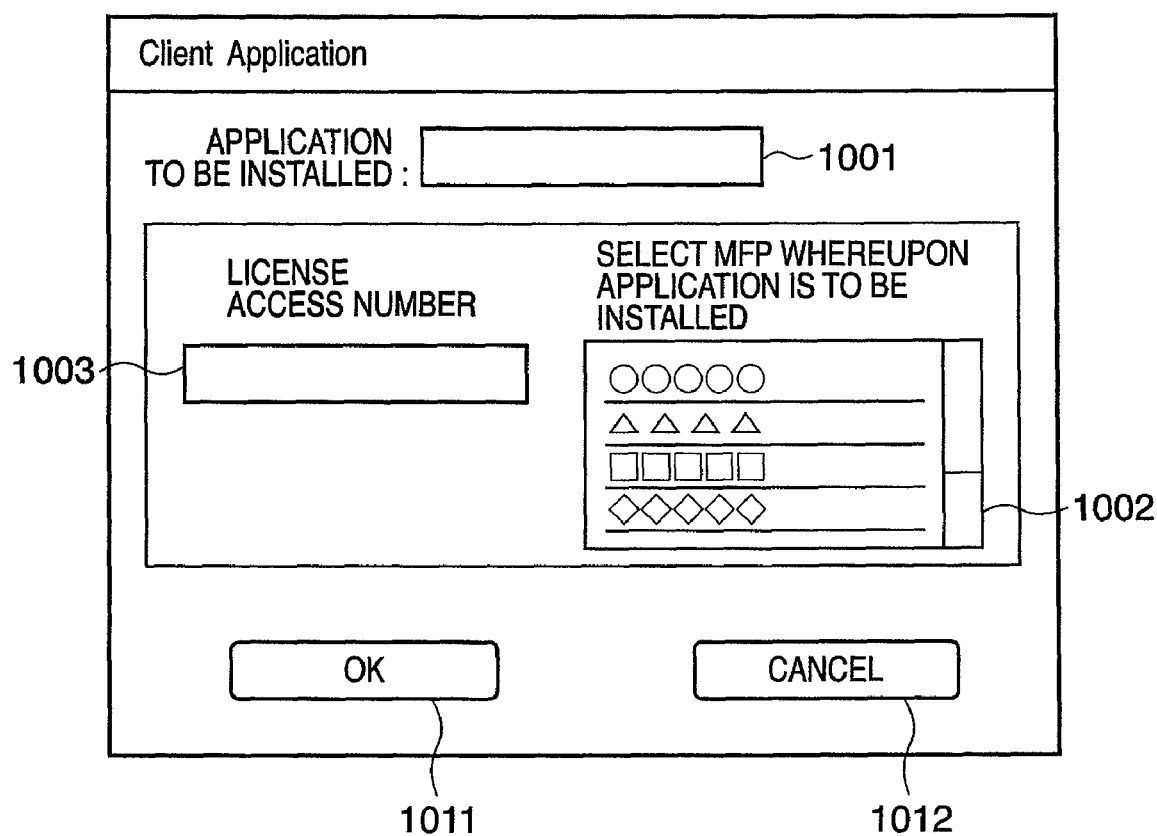
FIG. 10 depicts a dialogue window of an application install program, according to the first variant example.

FIG. 9 is a flowchart of the installation of the application on the MFP, according to a first variant example. FIG. 10 depicts the dialogue window of the application install program, according to the first variant example.

When the application install program is launched on the PC 120, per step S102-1, a search is performed for an MFP that is on the same subnet as the PC 120, per step S102-2. A configuration is organized such that a list of the found MFPs is displayed in a field 902 that is positioned in the dialogue window, per step S103-1, and a selection by the user of one or more MFPs is received, per step S103-2. It would be permissible for a display format in a field 1002 to use the IP address, the MFP model name, or a comment that is preset into each respective MFP by the installer.

Second Embodiment

According to a second embodiment, a description will be made of an example of the functions of the PC 120 being embedded in the MFP, according to the first embodiment. The second embodiment thus differs from the first embodiment in that the former does not require a separate freestanding PC.

System Configuration

Figure 11:
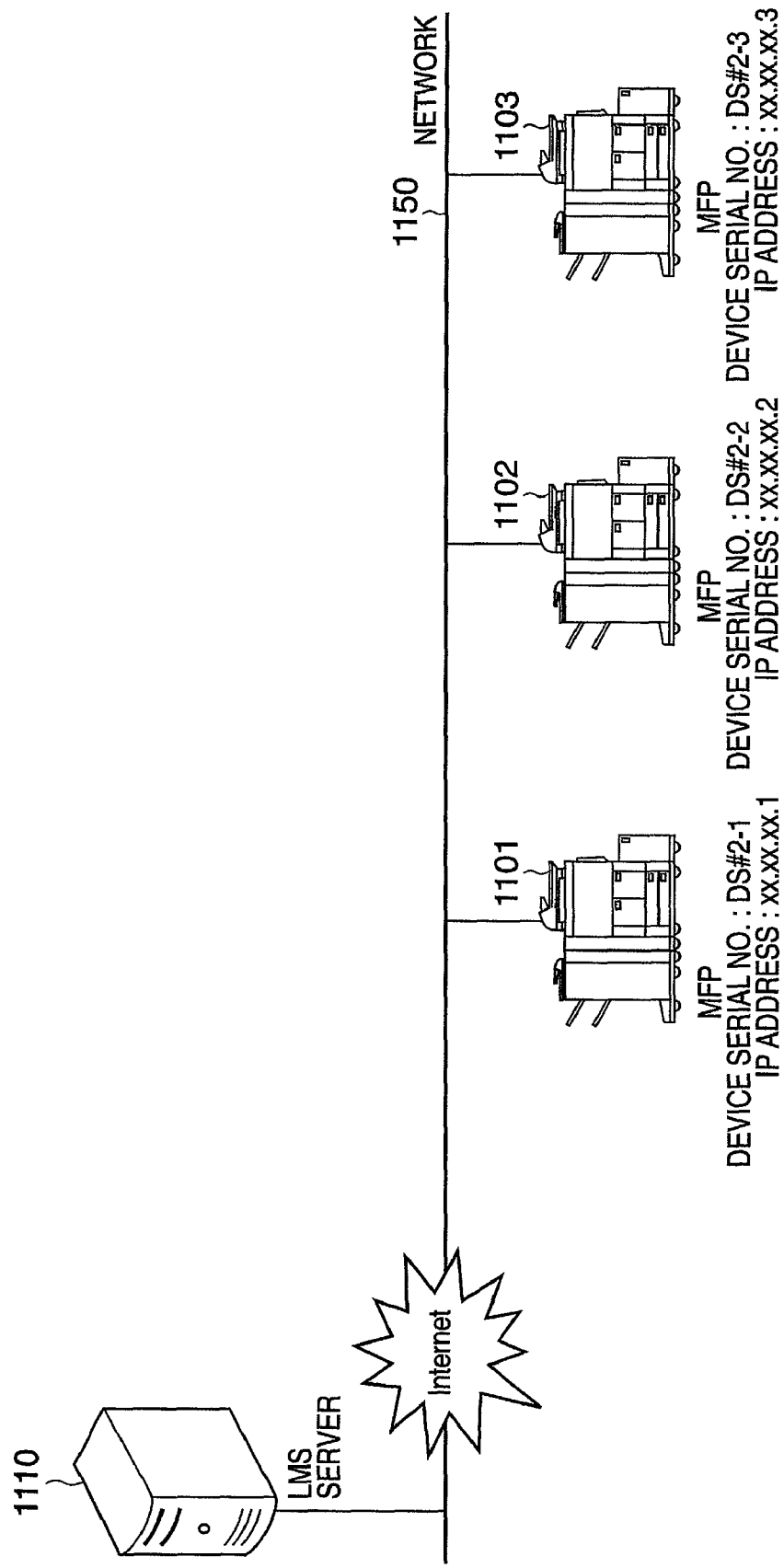
FIG. 11 is a configuration of a network system that includes an MFP, which is an image processing apparatus, according to a second embodiment.

FIG. 11 is a configuration of a network system that includes the MFP, which is an image processing apparatus, according to the second embodiment.

The system is configured of an LMS server 1110, which is the license management system, and digital multifunction peripherals MFP 1101 through 1103. The LMS server 1110 and the MFPs 1101 through 1103 are each bidirectionally connected via a network 1150. Following is a description of a condition wherein an application program is installed on a plurality of MFPs as a consequence of the user operating the MFP 1101, including being installed in the MFP 1101 itself.

It is presumed that each respective MFP has a device serial number, which is set thereto and that is unique to the MFP, i.e., DS #2-1, DS #2-2, DS #2-3, as well as a unique IP address, i.e., xx.xx.xx.1, xx.xx.xx.2, xx.xx.xx.3. The license management table is identical to the license management table that is described according to the first embodiment, and thus, a description thereof will be omitted herein. The interior configuration of the MFP is nearly identical to the description according to the first embodiment, with the exception that a web browser program is stored in the storage apparatus 303.

Detailed Operation of the Application Install Process

Figure 12:
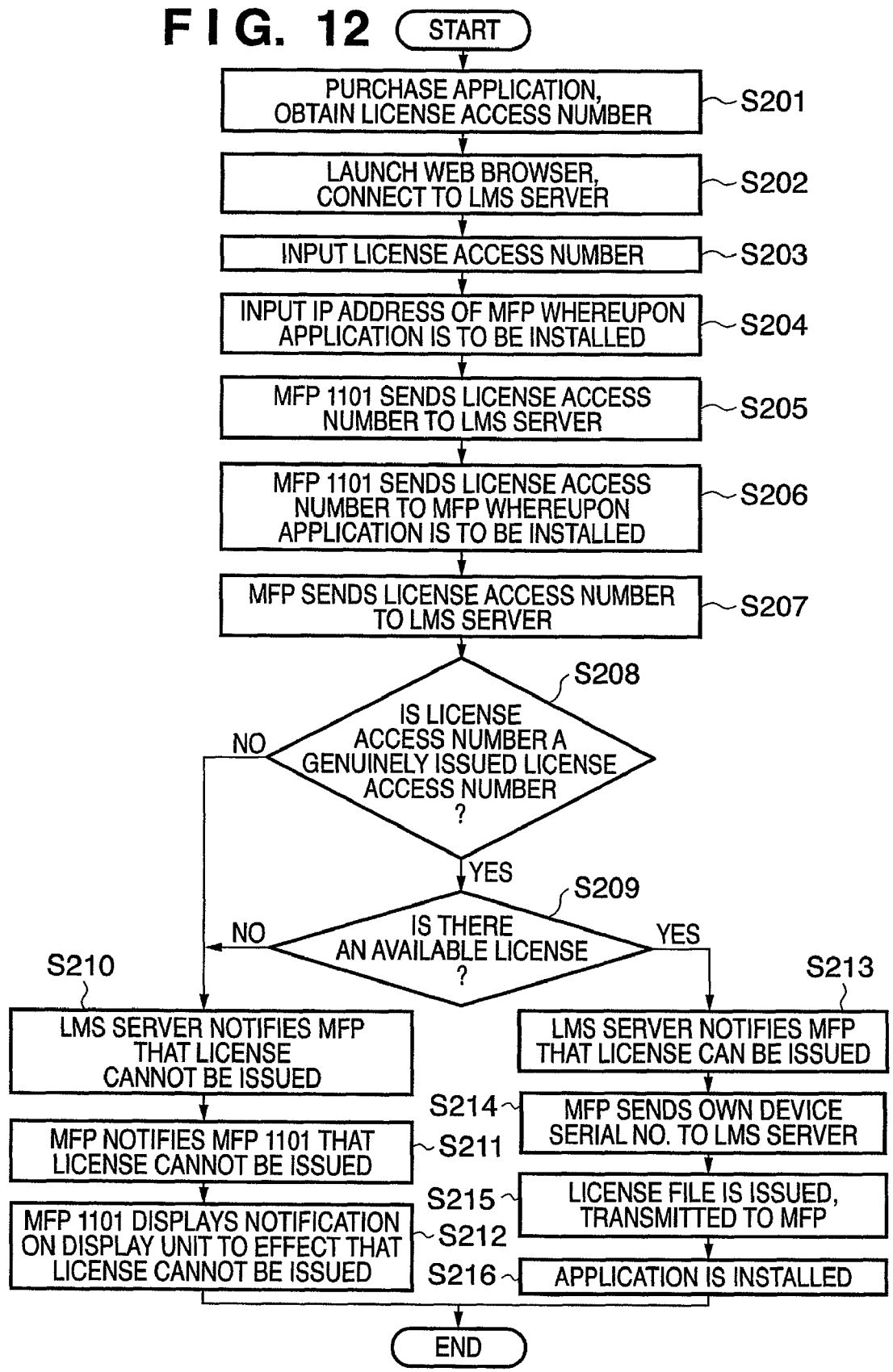
FIG. 12 is a flowchart of an installation of an application on the MFP, according to the second embodiment.

FIG. 12 is a flowchart of the installation of the application on the MFP, according to the second embodiment. The following operation of the MFPs 1101 through 1103 is implemented by the CPU 301 in each MFP executing the application install process program that is stored on the storage apparatus 303 thereof. The following operation of the LMS server 1110 is implemented by a license management program that is executed on the LMS server 1110.

In step S201, the user makes an offline purchase, for example, at a store, of an application and a license for the application. It is presumed in the present circumstance that a license for three MFPs is purchased. In the present circumstance, the license management table of the LMS server 1110 is as per FIG. 5, similar to the circumstance according to the first embodiment.

In step S202, the MFP 1101 launches the web browser and connects to the LMS server 1110.

Figure 13:
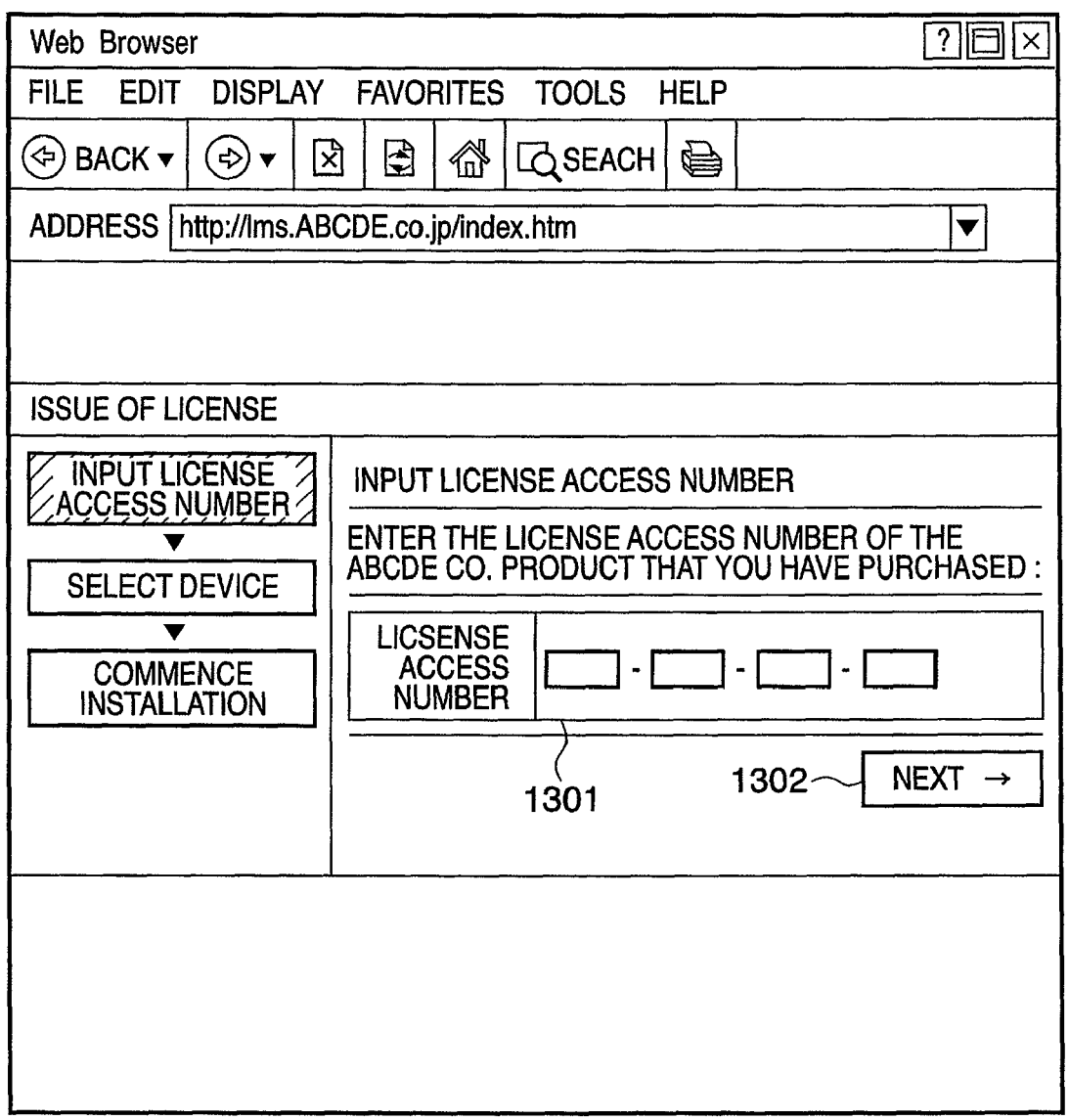
FIG. 13 depicts a state that displays an installation initialization window in a web browser.

FIG. 13 depicts a state that displays an installation initialization window in the web browser. The installation initialization window is displayed in the display unit 305 of the MFP 1101. A field 1301, wherein the license access number is inputted, is positioned in the installation initialization window.

In step S203, the MFP 1101 receives the input from the user of the license access number LA#1, which is inputted via the field 1301 in the installation window that is displayed in step S202. When the input is received and a Next button 1302 is depressed, the process proceeds to step S204.

In step S204, the MFP 1101 displays a webpage of a selection window of a device, i.e., an MFP, whereupon the application is to be installed.

Figure 14:
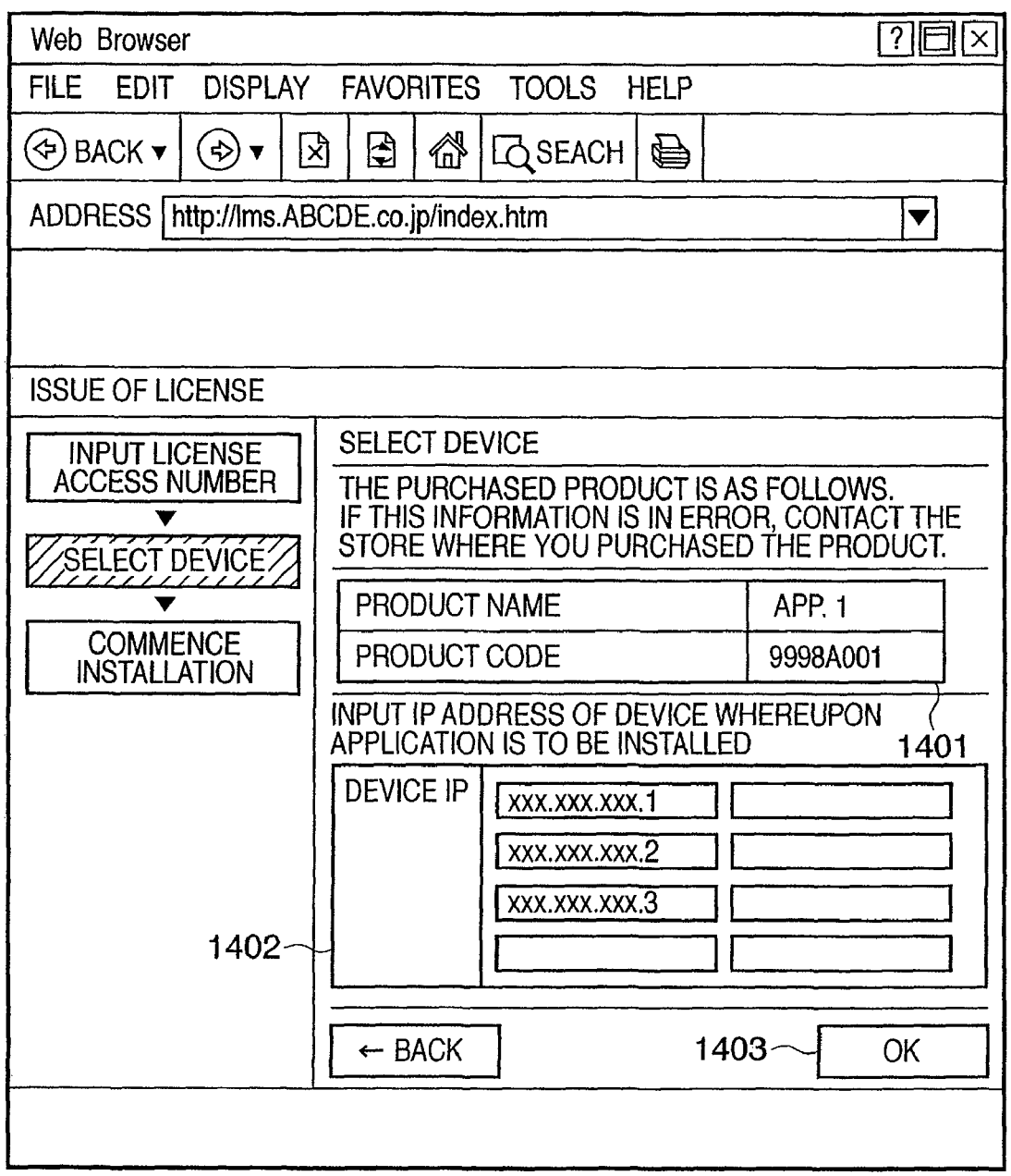
FIG. 14 depicts a state that displays a device selection window in a web browser.
Figure 15:
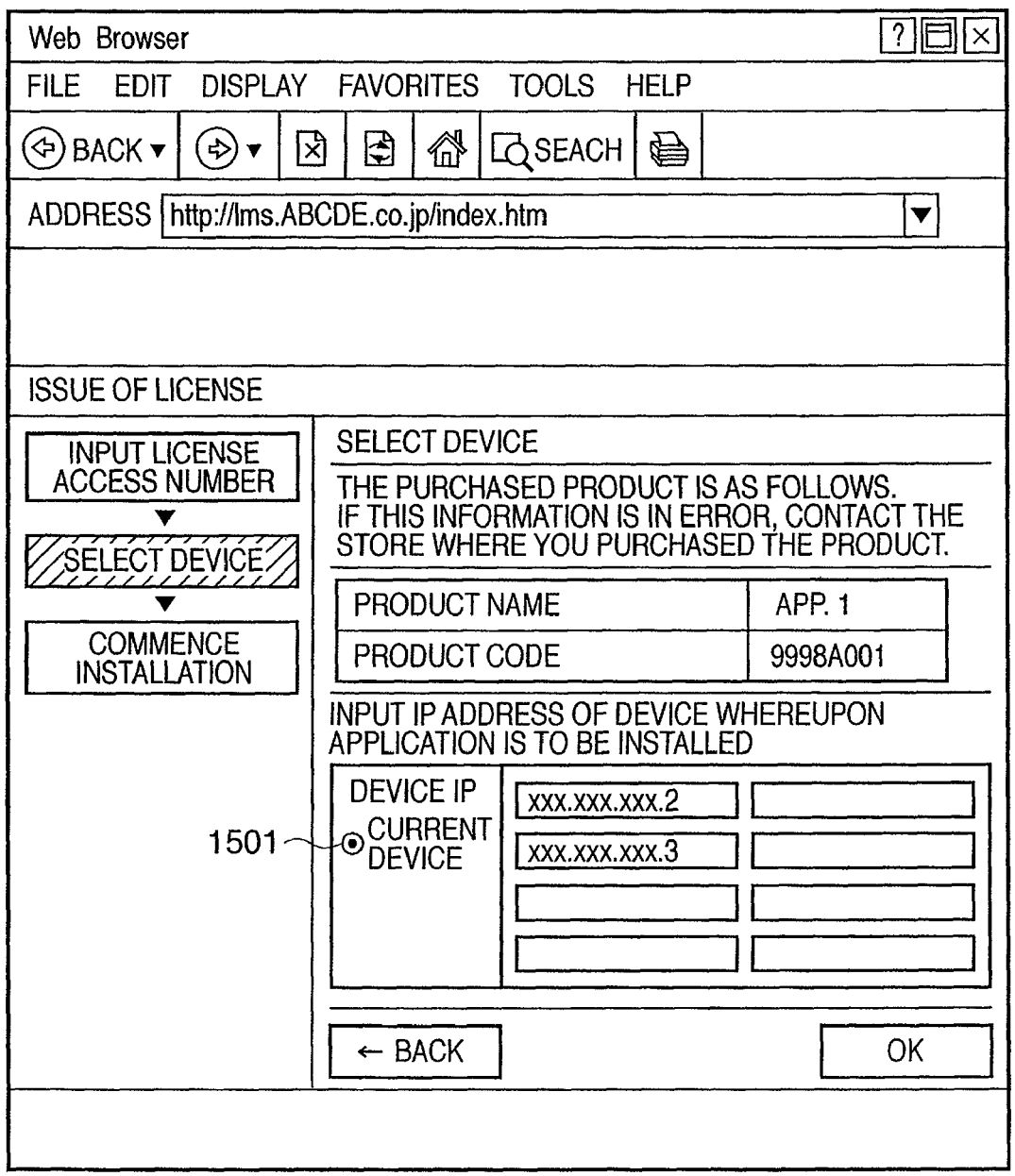
FIG. 15 depicts another example of a device selection window.

FIG. 14 depicts a state that displays the device selection window in the web browser. The device selection window is displayed in the display unit 305 of the MFP 1101. A field 1401 that displays information of the application to be installed is positioned in the device selection window. Also positioned in the device selection window is an input field 1402, wherein the IP address of the MFP whereupon the application is to be installed is inputted. Also positioned thereupon is such as an OK button 1403 and a cancel button 1404. In the present circumstance, it is presumed that the application is being installed on the MFP 1101, the MFP 1102, and the MFP 1103, and the user inputs "xx.xx.xx.1," "xx.xx.xx.2," and "xx.xx.xx.3," and depresses the OK button 1403. As shown in FIG. 15, it would also be permissible to configure a window that presumes a circumstance wherein the application is installed on the device whereupon the user is operating, the MFP 1101 in the present circumstance, and allows a selection of only a checkbox 1501 in the circumstance wherein the application is installed on the device whereupon the user is operating.

In step S205, the MFP 1101 sends the license access number LA#1 to the LMS server 1110. Step S205 is executed when it is specified in step S204 that the application is to be installed on the device whereupon the user is operating, the MFP 1101 in the present circumstance.

In step S206, the MFP 1101 sends the license access number LA#1 to the MFP whereupon the application is to be installed. In the present circumstance, the MFP 1101 sends the license access number LA#1 over the network 150 to the MFP 1102 and the MFP 1103. No particular need exists to send the license access number LA#1 of the device whereupon the user is operating, as the license access number LA#1 thereof is already known.

In step S207, the MFP 1102 and the MFP 1103 send the license access number LA#1 to the LMS server 1110.

In step S208, upon receipt of the license access number LA#1, the LMS server 1110 evaluates whether or not the license access number is a genuinely issued license access number. The LMS server 1110 verifies whether or not the LA# is present in the license management table 201. If the license access number is determined to be genuine, the process proceeds to step S209; if not, the process proceeds to step S210.

In step S209, the LMS server 1110 verifies whether or not the rest of the license pertaining to the license access number LA#1 is satisfied. Put another way, the LMS server 1110 verifies whether the fields of the DS# or the LF corresponding to the LA# are empty or not. If the LMS server 1110 determines that an empty field is present, the process proceeds to step S213; if not, the process proceeds to step S210.

In step S213, the LMS server 1110 notifies the MFP, i.e., the MFP 1101, the MFP 1102, and the MFP 1103 in the present circumstance, which sent the license access number LA#1 that the LMS server 1110 received in steps S205 and S207, that the MFP is eligible to have a license issued thereto.

In step S214, upon receipt of the notification of eligibility from the LMS server 1110, the MFP 1101, the MFP 1102, and the MFP 1103 send their device serial numbers DS#2-1, DS#2-2, and DS#2-3 to the LMS server 1110.

In step S215, the LMS server 1110 receives the DS#2-1, DS#2-2, and DS#2-3, and enters the serial numbers in the license management table 201. The LMS server 1110 issues a license file LF#2-1, LF#2-2, and LF#2-3, which it sends to the MFP 1101, the MFP 1102, and the MFP 1103.

FIG. 16 depicts the license management table immediately after the license file is issued. DS#2-1, DS#2-2, and DS#2-3 are registered in the three device serial number DS# fields corresponding to the license access number LA#1 that is issued in step S201. The corresponding license files LF#2-1, LF#2-2, and LF#2-3 are also registered to match.

In step S216, the MFP 1101, the MFP 1102, and the MFP 1103 respectively receive the license files LF#2-1, LF#2-2, and LF#2-3, which they employ in installing the application. More specifically, the MFP 1101, the MFP 1102, and the MFP 1103 download an application program, i.e., a file, from the LMS server 1110, and perform an activation upon the application program. The process flow terminates thereby. It would also be permissible to configure the distribution of the application program such that the sender performs compression thereupon, and the receiver decompresses the application program prior to use thereof.

In step S210, the LMS server 1110 notifies the MFP, i.e., the MFP 1101 in the present circumstance, which was evaluated as being ineligible to have a license issued thereto, that the MFP is ineligible to have a license issued thereto.

For example, if it is determined in step S208 that the license access number has not been genuinely issued, all of the MFPs whereupon the application program is to be installed, i.e., the MFP 1101, the MFP 1102, and the MFP 1103 in the present circumstance, are so notified. If, on the other hand, it is determined in step S209 that an insufficiency of licenses exists, only the MFP that is determined to have the license insufficiency is so notified. The description in the present circumstance presumes that it is determined that an insufficiency of licenses exists vis-a-vis the MFP 1102, and hence, the MFP 1102 is notified that it is ineligible to have a license issued thereto.

In step S211, the MFP 1102 notifies the MFP 1101 to the effect that the MFP 1102 is ineligible to have a license issued thereto.

Figure 17:
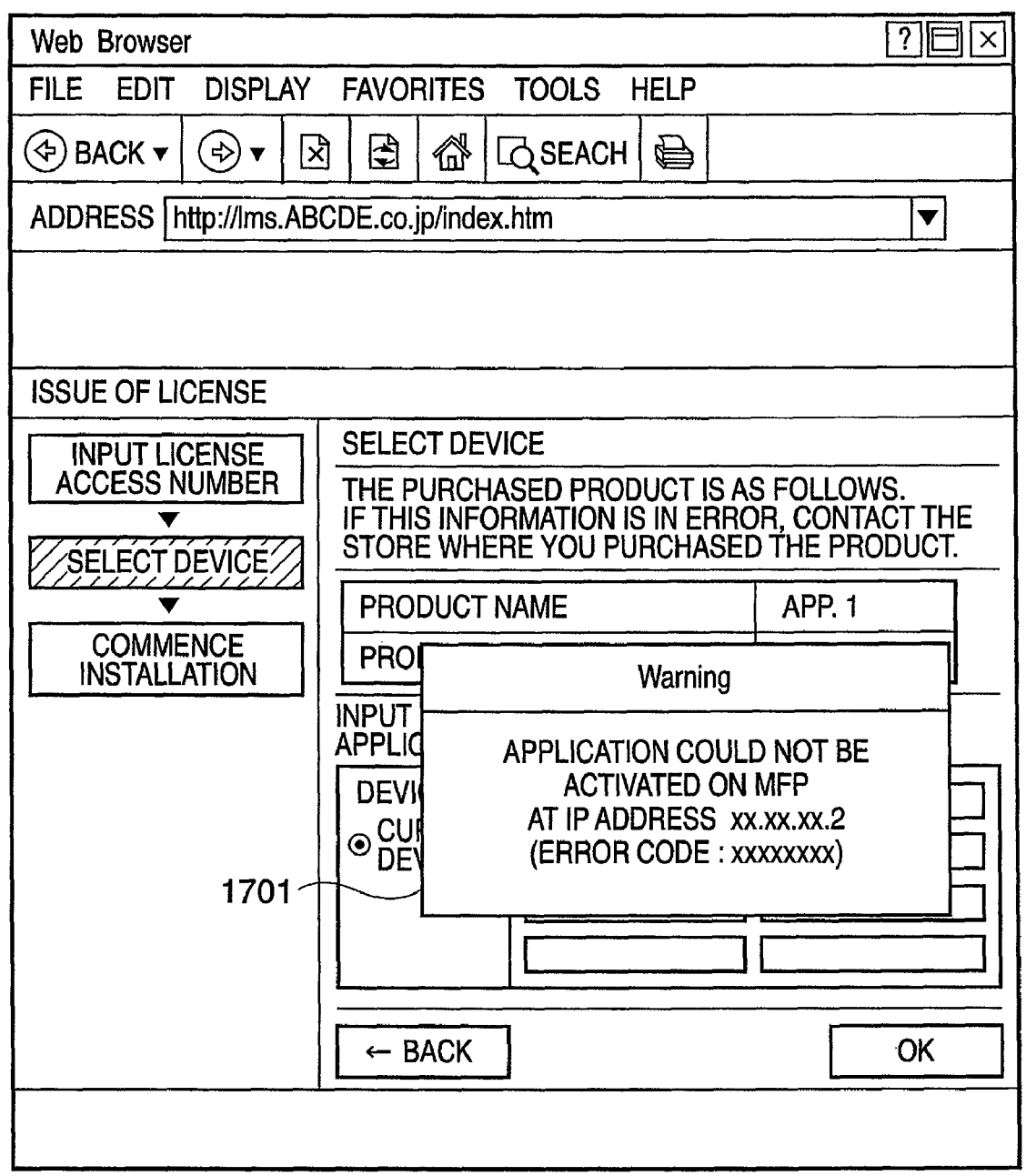
FIG. 17 depicts an example of a display window that issues a notification that an installation could not be carried out.

In step S212, upon receipt of the notice from the MFP 1102 of the ineligibility to have a license issued thereto, the MFP 1101 displays a notice to the effect thereof on the display unit 305. Hence, the user is thus notified that the application could not be installed. The process flow terminates thereby. FIG. 17 depicts an example of the display window that issues the notification that the installation could not be carried out.

Per the foregoing, according to the second embodiment, the trigger for each respective MFP to execute the application install process is the notification from the MFP 1101, which the user is operating, of the license access number. Performing the install process according to the preceding operation allows obviating the complex work of searching out the device ID of the MFP on the part of the user, leading to a potential increase in usability. The second embodiment has the particular advantage over the first embodiment of not requiring a PC to be installed for application installation purposes.

Second Variant Example

While the description of step S204 involved direct reception of the IP address on the part of the MFP whereupon the application is to be installed, another permissible configuration would be for the MFP 1101 to search for MEPs that are connected to the network, for example, on a common subnet, and receive a selection of the MFP whereupon the application is to be installed from a list of MFPs thus detected.

Figure 18:
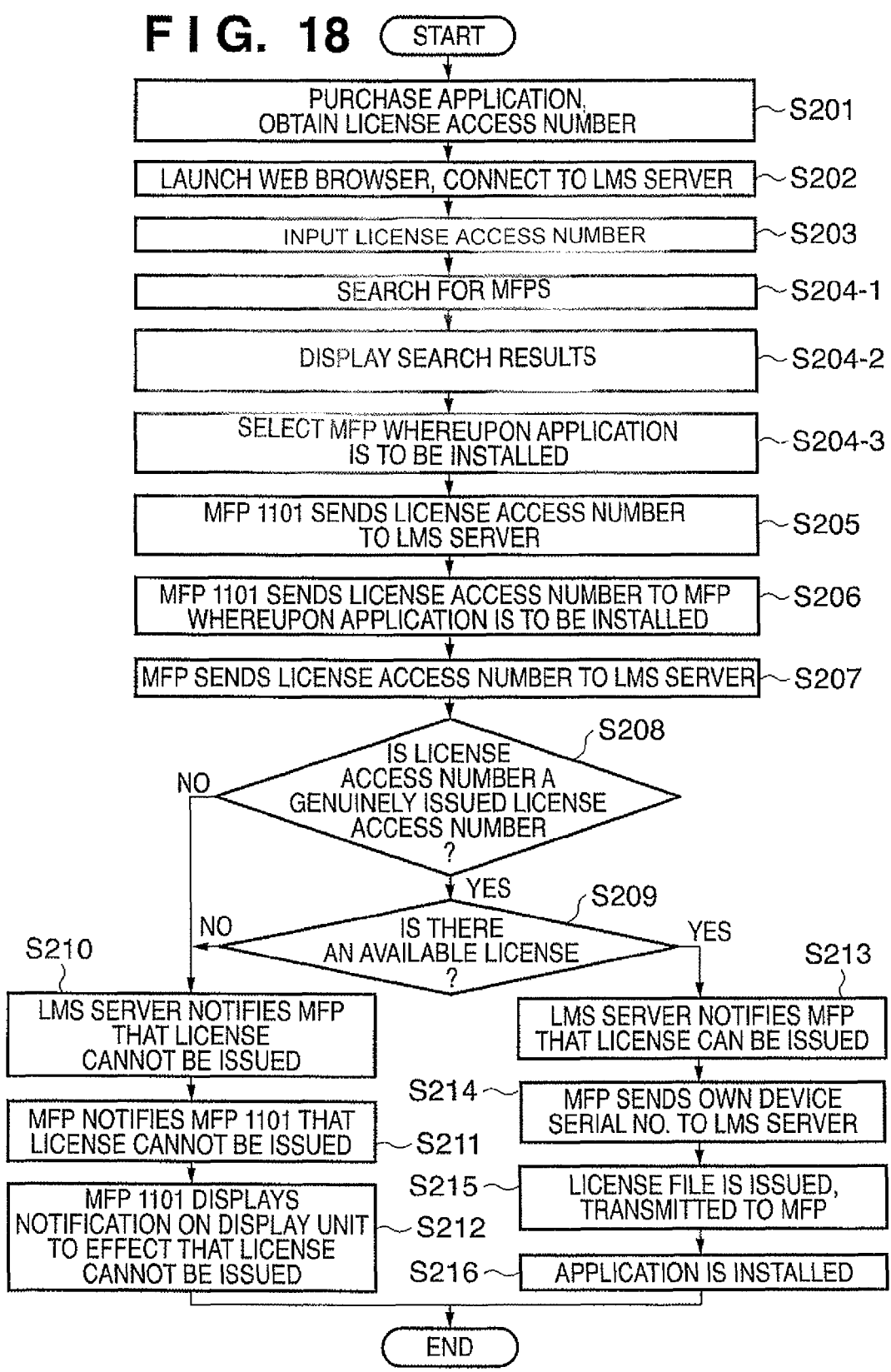
FIG. 18 is a flowchart of an installation of an application on the MFP, according to a second variant example.
Figure 19:
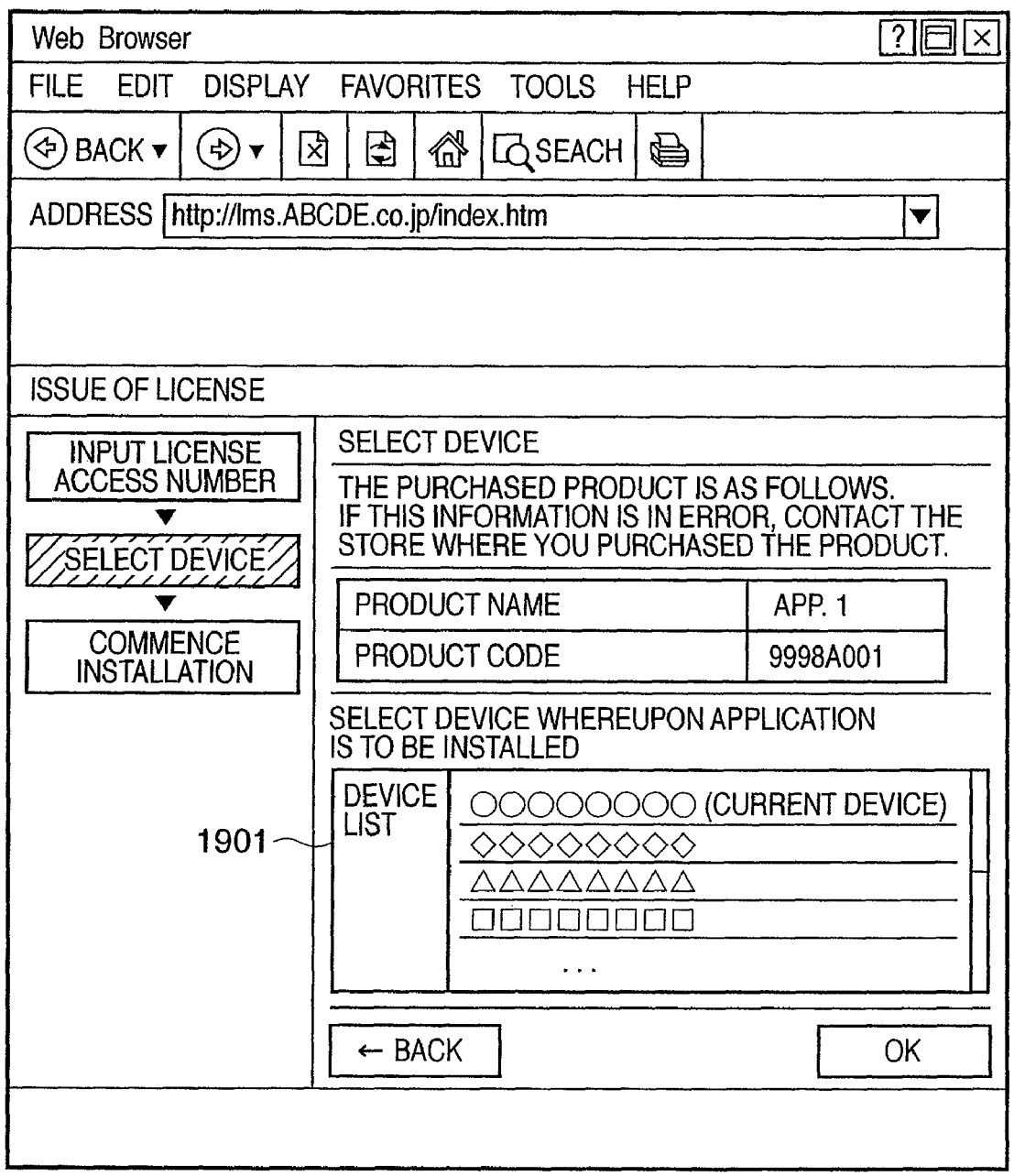
FIG. 19 depicts an installation initialization window according to the second variant example.

FIG. 18 is a flowchart of the installation of the application on the MFP, according to a second variant example. FIG. 19 depicts the device selection window, according to the second variant example.

When the web browser is launched on the MFP 1101, and the LA#1 is inputted thereto, a search is performed for an MFP that is on the same subnet as the MFP 1101, per step S204-1. A configuration is organized such that a list of the found MFPs is displayed in a field 1901 that is positioned in the dialogue window, per step S204-2, and a selection by the user of one or more MFPs is received, per step S204-3.

Third Variant Example

The description that has been performed according to the first and second embodiments involves simultaneously purchasing and installing, either online or offline, both an application to be activated and a license pertaining thereto.

It would be permissible, however, to have a configuration such that the application and the license would be purchased and installed separately. For example, it would be permissible for the application to be distributed via an application server separately from the license.

It would also be permissible to have a configuration wherein the application to be activated is pre-installed on the image forming apparatus, in a non-activated state.

Other Embodiments

The present invention is achieved by supplying a program that implements the functions of the embodiments, either directly or remotely, to a system or an apparatus, and having the system or the apparatus load and execute the program code thus supplied thereto. Accordingly, the program code that is installed on a computer in order to implement the function processing of the present invention on the computer is itself included in the technical scope of the present invention.

In such a circumstance, the form that the program takes, whether it be such as object code, a program that is executed by an interpreter, or a script data that is supplied to an operating system, is irrelevant, provided that the code possesses the function of a program.

A storage medium for supplying the program may be, for example, such as a floppy disk, a hard drive, an optical disc, i.e., a CD or a DVD, a magneto-optical disk (MO), a magnetic tape, a nonvolatile memory card, or a ROM.

Another method of supplying the program would be to use a web browser on a client computer to connect to a webpage on the Internet, and download either the computer program of the present invention itself from the webpage, or a compressed file including an automatic install function, to a hard drive or other storage medium. Implementation would also be possible by segmenting the program code that configures the present invention into a plurality of files, and downloading each respective file from a different webpage. Hence, a web server that downloads the program file that implements the function processing of the present invention on the computer to a plurality of users is itself included in the claims of the present invention.

Implementation would also be possible by distributing the program of the present invention to the user in an encrypted form on a storage medium such as a CD-ROM, having the user who satisfies a prescribed condition download a key information from a webpage over the Internet that will decrypt the program file thus encrypted, and use the key information to execute the encrypted program and install the encrypted program on the computer.

It would also be possible to implement the functions of the embodiments through a process that is performed, in whole or in part, by an operating system or other software running on the computer, in accordance with the instructions of the program that is loaded thereupon, in addition to implementing the functions of the embodiments by having the computer execute the program.

It would also be possible to implement the functions of the embodiments through a process that is performed, in whole or in part, by a CPU or other unit that is included in an expansion board that is included in the computer, or an expansion unit that is connected to the computer, after writing the program that is loaded from the storage medium into a memory that is included in the expansion board or the expansion unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-337587, filed Dec. 14, 2006, which is hereby incorporated by reference herein in its entirety.

What is claimed is:

1. A license management system, including a license management server and a plurality of image forming apparatuses which are bi-directionally connected over a network to the server, for performing an activation process of an application program that runs on the image forming apparatuses in accordance with an operation by a user, wherein, the license management server comprises:
a storage unit constructed to store a license access number that is associated with the application program;
a determination unit constructed to determine whether or not it is possible to issue a new license file, in accordance with the license access number and a number of already issued license files that are issued in accordance with the license access number; and
an issue unit constructed to issue a license file in accordance with the license access number and a unique information that is preset on the image forming apparatus; and wherein, at least one of the plurality of image forming apparatuses comprises:
a first input unit constructed to input the license access number based on an operation input from the user;
a search unit constructed to search for other image forming apparatuses that are connected over the network;
a display unit constructed to display a selection screen including a list of the other image forming apparatuses that are detected by the search unit;
a designation unit constructed to designate the image forming apparatus itself and one or more other image forming apparatuses based on an operation input from the user via the selection screen;
a first transmission unit constructed to transmit, when the license access number is input and the image forming apparatus itself and the one or more other image forming apparatuses are designated, the license access number to the license management server and to the designated one or more other image forming apparatuses so that the license management server issues the license file for the image forming apparatus itself and also issues the license file to the designated one or more other image forming apparatuses when the one or more image forming apparatuses transmit the license access number to the license management server;
a second input unit constructed to input an information from the license management server indicating whether or not it is possible to issue the license file;
a second transmission unit constructed to transmit the unique information that is preset on the image forming apparatus to the license management server when the second input units inputs the information indicating that it is possible to issue the license file;
a third input unit constructed to input the license file that is issued from the license management server; and
an activation unit constructed to execute the activation of the application program in accordance with the license file.

2. The license management system according to claim 1, wherein, the image forming apparatus further comprises:
an error notification unit constructed to output a notification that the license file could not be obtained, when the second input unit inputs the information indicating that it is not possible to issue the license file.

3. The license management system according to claim 2, wherein, the error notification unit displays an error on a display unit of the image forming apparatus.

4. A method of controlling a license management system, including a license management server and a plurality of image forming apparatuses which are bi-directionally connected over a network for performing an activation process of an application program that runs on the image forming apparatus in accordance with an operation by a user, wherein, the license management server performs the steps of:
  storing in a storage unit a license access number that is associated with the application program;
  determining whether or not it is possible to issue a new license file, in accordance with the license access number and a number of already issued license files that are issued in accordance with the license access number; and
  issuing a license file in accordance with the license access number and a unique information that is preset on the image forming apparatus; and
wherein, at least one of the plurality of image forming apparatuses performs the steps of:
  a first input step of inputting the license access number based on an operation input from the user;
  searching for other image forming apparatuses that are connected over the network;
  displaying on a display unit a selection screen including a list of the other image forming apparatuses that are detected by the searching step;
  designating the image forming apparatus itself and one or more other image forming apparatuses based on an operation input from the user via the selection screen;
  a first transmission step of transmitting, when the license access number is input and the image forming apparatus itself and the one or more other image forming apparatuses are designated, the license access number to the license management server and to the designated one or more other image forming apparatuses so that the license management server issues the license file for the image forming apparatus itself and also issues the license file to the designated one or more other image forming apparatuses when the one or more image forming apparatuses transmit the license access number to the license management server;
  a second input step of inputting an information from the license management server indicating whether or not it is possible to issue the license file;
  a second transmission step of transmitting the unique information that is preset on the image forming apparatus to the license management server when the information input by the second input step indicates that it is possible to issue the license file;
  a third input step of inputting the license file that is issued from the license management server; and
  an activation step of executing the activation of the application program in accordance with the license file input by the third input step.

5. The license management system control method according to claim 4, wherein, the image forming apparatus further performs an error notification step of outputting a notification that the license file could not be obtained, when the information input by the second input step indicates that it is not possible to issue the license file.

6. The license management system control method according to claim 5, wherein, the error notification step displays an error on the display unit of the image forming apparatus.

7. An image processing apparatus adapted to perform an activation process of an application program that runs on the image processing apparatus by communicating with a license management server over a network, the image processing apparatus comprising:
  a first input unit constructed to input a license access number, based on an operation input from a user;
  a search unit constructed to search for other image processing apparatuses that are connected over the network;
  a display unit constructed to display a selection screen including a list of the other image processing apparatuses that are detected by the search unit;
  a designation unit constructed to designate the image processing apparatus itself and one or more other image processing apparatuses based on an operation input from the user via the selection screen;
  a first transmission unit constructed to transmit, when the license access number is input and the image processing apparatus itself and the one or more other image processing apparatuses are designated, the license access number to the license management server and to the designated one or more other image forming apparatuses so that the license management server issues the license file for the image processing apparatus itself and also issues the license file to the designated one or more other image forming apparatuses when the one or more image forming apparatuses transmit the license access number to the license management server;
  a second input unit constructed to input an information from the license management server indicating whether or not it is possible to issue the license file;
  a second transmission unit constructed to transmit unique information that is preset on the image processing apparatus to the license management server when the information input by the second input unit indicates that it is possible to issue the license file;
  a third input unit constructed to input the license file that is issued from the license management server; and
  an activation unit constructed to execute the activation of the application program in accordance with the license file.

8. A method of controlling an image processing apparatus, adapted to perform an activation process of an application program that runs on the image processing apparatus, by communicating with a license management server over a network, the image processing apparatus performing the steps of:
  a first input step of inputting a license access number based on an operation input from the user;
  a search step of searching for other image processing apparatuses that are connected over the network;
  a display step of displaying on a display unit a selection screen including a list of the other image processing apparatuses that are detected by the search step;
  a designation step of designating the image processing apparatus itself and one or more other image processing apparatuses based on an operation input from the user via the selection screen;
  a first transmission step of transmitting, when the license access number is input and the image processing apparatus itself and the one or more other image processing apparatuses are designated, the license access number to the license management server and to the designated one or more other image forming apparatuses so that the license management server issues the license file for the image processing apparatus itself and also issues the license file to the designated one or more other image forming apparatuses when the one or more image forming apparatuses transmit the license access number to the license management server;
  a second input step of inputting an information from the license management server indicating whether or not it is possible to issue the license file;
  a second transmission step of transmitting unique information that is preset on the image processing apparatus to the license management server when the information input by the second input step indicates that it is possible to issue the license file;

a third input step of inputting the license file that is issued from the license management server; and an activation step of executing the activation of the application program in accordance with the license file.

9. A non-transitory computer-readable storage medium that retrievably stores a computer-executable program executed by an image processing apparatus adapted to perform an activation process of an application program that runs on the image processing apparatus, by communicating with a license management server over a network, the program executed by the image processing apparatus performing the steps of:

a first input step of inputting a license access number based on an operation input from the user;

a search step of searching for other image processing apparatuses that are connected over the network;

a display step of displaying on a display unit a selection screen including a list of the other image processing apparatuses that are detected by the search step;

a designation step of designating the image processing apparatus itself and one or more other image processing apparatuses based on an operation input from the user via the selection screen;

a first transmission step of transmitting, when the license access number is input and the image processing apparatus itself and the one or more other image processing apparatuses are designated, the license access number to the license management server and to the designated one or more other image forming apparatuses so that the license management server issues the license file for the image processing apparatus itself and also issues the license file to the designated one or more other image forming apparatuses when the one or more image forming apparatuses transmit the license access number to the license management server;

a second input step of inputting an information from the license management server indicating whether or not it is possible to issue the license file;

a second transmission step of transmitting unique information that is preset on the image processing apparatus to the license management server when the information input by the second input step indicates that it is possible to issue the license file;

a third input step of inputting the license file that is issued from the license management server; and an activation step of executing the activation of the application program in accordance with the license file.

* * * * *